US012646820B2

(12) United States Patent
Ryu

(10) Patent No.: US 12,646,820 B2
(45) Date of Patent: Jun. 2, 2026

(54) EMBEDDED WIRELESS IDENTIFICATION TAG FOR TIRE AND METHOD OF MANUFACTURING THE SAME

(71) Applicant: WILL CHEM KOREA CO., LTD., Ansan-si (KR)

(72) Inventor: Gil Soo Ryu, Suwon-si (KR)

(73) Assignee: WISCON CO., Ltd., Ansan-si (KR)

( * ) Notice: Subject to any disclaimer, the term of this patent is extended or adjusted under 35 U.S.C. 154(b) by 0 days.

(21) Appl. No.: 18/991,126

(22) Filed: Dec. 20, 2024

(65) Prior Publication Data

US 2025/0379352 A1      Dec. 11, 2025

(30) Foreign Application Priority Data

Jun. 11, 2024      (KR) ......................... 10-2024-0075698

(51) Int. Cl.
*H01Q 1/22*          (2006.01)
*G06K 19/077*        (2006.01)
*H01Q 11/08*         (2006.01)

(52) U.S. Cl.
CPC ..... *H01Q 1/2241* (2013.01); *G06K 19/07758* (2013.01); *G06K 19/07773* (2013.01); *H01Q 11/08* (2013.01)

(58) Field of Classification Search
CPC ................. H01Q 1/2241; H01Q 11/08; G06K 19/07758; G06K 19/07773
USPC ....................................................... 235/492
See application file for complete search history.

(56) References Cited

U.S. PATENT DOCUMENTS

| | | | | |
|---|---|---|---|---|
| 2005/0231343 A1* | 10/2005 | Sinnett | ................... | H05K 3/301 |
| | | | | 340/693.12 |
| 2007/0182530 A1* | 8/2007 | Pilz | ...................... | H01Q 1/2241 |
| | | | | 152/152.1 |
| 2011/0074550 A1* | 3/2011 | Fenkanyn | ............ | G06K 7/0008 |
| | | | | 340/10.1 |
| 2013/0153669 A1 | 6/2013 | Sinnett | | |
| 2013/0299597 A1 | 11/2013 | Sinnett | | |
| 2017/0308782 A1* | 10/2017 | Burkholder | .......... | H05K 1/0283 |
| 2020/0108575 A1* | 4/2020 | Nagayoshi | ............. | B29D 30/60 |

(Continued)

FOREIGN PATENT DOCUMENTS

| | | | |
|---|---|---|---|
| EP | 3179413 A1 | 6/2017 | |
| KR | 10-0798839 B1 | 1/2008 | |

(Continued)

*Primary Examiner* — Allyson N Trail

(74) *Attorney, Agent, or Firm* — Heedong Chae; Lucem, PC

(57) ABSTRACT

The present disclosure relates to an attachable wireless identification tag for a tire, the attachable wireless identification tag for a tire according to the embodiment of the present disclosure is technically characterized by including a PCB including a main body part, and antenna installation parts extending from two opposite sides of the main body part, an RFID chip installed on the main body part, and an antenna having a predetermined length, formed in a helical shape, and fitted and coupled in a longitudinal direction of the installation part, in which antenna a forward/rearward width of an interior defined by the helical shape of the antenna is larger than a forward/rearward width of the PCB, such that the antenna installation part and the antenna are spaced apart from each other at a predetermined interval to form a space portion.

7 Claims, 5 Drawing Sheets

(56) References Cited

U.S. PATENT DOCUMENTS

| | | | | |
|---|---|---|---|---|
| 2020/0148011 | A1* | 5/2020 | Greco | H01Q 1/36 |
| 2020/0215857 | A1 | 7/2020 | Greco | |
| 2021/0098858 | A1 | 4/2021 | Destraves | |
| 2022/0126633 | A1* | 4/2022 | Hosomi | B60C 15/0036 |
| 2022/0297482 | A1* | 9/2022 | Suita | B29D 30/48 |
| 2023/0014878 | A1* | 1/2023 | Destraves | H01Q 1/2241 |
| 2023/0161993 | A1* | 5/2023 | Lin | G06K 19/07764 |
| | | | | 73/146.2 |
| 2023/0274122 | A1* | 8/2023 | Sugimura | G06K 19/07764 |
| | | | | 235/492 |

FOREIGN PATENT DOCUMENTS

| | | | | |
|---|---|---|---|---|
| KR | 10-2570752 | B1 | 8/2023 | |
| KR | 102636494 | B1 * | 2/2024 | G06K 19/07794 |

* cited by examiner

EMBEDDED WIRELESS IDENTIFICATION TAG FOR TIRE AND METHOD OF MANUFACTURING THE SAME

CROSS-REFERENCE TO RELATED APPLICATIONS

This application claims the priority of Korean Patent Application No. 10-2024-0075698 filed on Jun. 11, 2024, in the Korean Intellectual Property Office, the disclosure of which is incorporated herein by reference.

BACKGROUND

Field

The present disclosure relates to an attachable wireless identification tag for a tire, and more particularly, to an attachable wireless identification tag for a tire, which is capable of being completely attached to an interior of a tire by a rubber inserted between an antenna and a board during tire vulcanization, and method of manufacturing the same.

Description of the Related Art

In the case of vehicle tires, it is necessary to quickly identify unique information about the tires, such as types, manufacturing numbers, specifications, characteristics, processing history, and usage history, for manufacturing management, shipment, and distribution management.

In particular, product liability law states that if defective products cause damage to the life, bodies, or properties of other individuals, the manufacturers are liable for the damage regardless of fault. Therefore, the manufacturers need to thoroughly manage the tires.

Therefore, in order to manage the tires, the tire attach and use RFID tags as wireless manufacturers identification tags that may memorize the product history and the usage history.

Most of the wireless identification tags in the related art are helical wireless identification tags. Because the helical wireless identification tag has an empty helical (spiral) structure and is inserted into the tire, air in the helical structure cannot be completely discharged. That is, the wireless identification tag in the related art is produced as a product configured to be inserted into the tire in which air is present in the helical structure. This configuration acts as a defective element.

For example, there is a concern that bubbles may be produced in the tire, the bubbles may weaken a bonding force of the wireless identification tag, and the wireless identification tag may be easily separated. Furthermore, there is a problem in that an impact may be consistently applied by a road surface state, a vehicle state, and the like while the vehicle travels, and the impact may degrade durability of the tire embedded with the wireless identification tag.

In order to solve the above-mentioned problem, the wireless identification tag shaped to have an antenna embedded in a board has been developed. However, because the wireless identification tag having the embedded antenna is configured such that only the board is attached directly to the tire, there is a problem in that the board attached to the tire may be damaged, which causes a lack of durability.

There is a need to conduct studies on a method of manufacturing the wireless identification tag to solve the above-mentioned problem.

DOCUMENT OF RELATED ART

Patent Document (Patent Document 1) Korean Patent No. 10-2332843 (Nov. 25, 2021)

SUMMARY

An object to be achieved by the present disclosure is to provide an attachable wireless identification tag for a tire, which is capable of being completely attached to an interior of a tire by a rubber inserted between an antenna and a board during tire vulcanization, and a method of manufacturing the same.

In order to achieve the above-mentioned object, an attachable wireless identification tag for a tire according to an embodiment of the present disclosure includes: a PCB including a main body part, and antenna installation parts extending from two opposite sides of the main body part; an RFID installed on the main body part; and an antenna having a predetermined length, formed in a helical shape, and fitted and coupled in a longitudinal direction of the antenna installation part, in which a forward/rearward width of an interior defined by the helical shape of the antenna is larger than a forward/rearward width of the PCB, such that the antenna installation part and the antenna are spaced apart from each other at a predetermined interval to form a space portion.

In addition, according to the attachable wireless identification tag for a tire according to the embodiment of the present disclosure, fitting holes may be respectively formed in the main body part and the antenna installation part, one end of the antenna may be coupled to the fitting hole of the main body part, and the other end of the antenna may be coupled to the fitting hole of the antenna installation part.

In addition, according to the attachable wireless identification tag for a tire according to the embodiment of the present disclosure, a fracturable guide groove may be formed in a portion of the antenna installation part coupled to the main body part.

In addition, the attachable wireless identification tag for a tire according to the embodiment of the present disclosure may further include: a protective cap molded on the main body part to protect the RFID chip.

In addition, according to the attachable wireless identification tag for a tire according to the embodiment of the present disclosure, at least one rubber insertion hole may be formed in the longitudinal direction of the antenna installation part.

A method of manufacturing an attachable wireless identification tag for a tire according to another embodiment of the present disclosure includes: preparing a PCB including a main body part, to which an RFID chip is attached, and antenna installation parts extending from two opposite sides of the main body part; manufacturing an antenna having a predetermined length, formed in a helical shape, made of a metallic material, and configured such that a forward/rearward width of an interior defined by the helical shape is larger than a forward/rearward width of the PCB; inserting, fitting, and coupling the antenna into an end of the antenna installation part; and bonding the fitted and coupled antenna and the RFID chip to connect the antenna and the RFID chip.

The method of manufacturing an attachable wireless identification tag for a tire according to the embodiment of the present disclosure may include: molding a protective cap on the main body part of the PCB to which the antenna is coupled; applying a primer onto the PCB; and applying a rubber solution onto the PCB.

The method of manufacturing an attachable wireless identification tag for a tire according to the embodiment of the present disclosure may further include: forming a frac-turable guide groove in a portion of the antenna installation part coupled to the antenna.

The method of manufacturing an attachable wireless identification tag for a tire according to the embodiment of the present disclosure may further include: forming at least one rubber insertion hole in a longitudinal direction of the antenna installation part.

According to the present disclosure, the wireless identi-fication tag may be completely attached to the interior of the tire by the rubber inserted between the antenna and the board during the tire vulcanization, thereby improving the attach-ment force of the wireless identification tag to the tire and improving the durability.

In addition, according to the present disclosure, the excel-lent bonding force of the wireless identification tag to the tire may be maintained for a long period of time, such that the durability of the tire to which the wireless identification tag is attached may be further improved.

In addition, according to the present disclosure, the frac-turable guide groove is formed, such that the fracturable guide groove of the board is fractured first, and the fractures of the other portions are suppressed. Further, even though the fracturable guide groove is fractured, the connectivity of the RFID chip and the antenna is maintained, the wireless identification tag may still operate.

BRIEF DESCRIPTION OF DRAWINGS

The above and other aspects, features and other advan-tages of the present disclosure will be more clearly under-stood from the following detailed description taken in con-junction with the accompanying drawings, in which.

DETAILED DESCRIPTION OF THE EMBODIMENT

Hereinafter, a specific example of a method of manufac-turing an attachable wireless identification tag for a tire, which has durability improved and bonding force, according to the present disclosure will be described in more detail. However, the following exemplary embodiments are provided as examples for fully transferring the spirit of the present disclosure to those skilled in the art.

Therefore, the present disclosure is not limited to the exemplary embodiments described below and may be speci-fied as other aspects. The embodiments set forth below are merely provided to clarify the spirit of the present disclo-sure, and the present disclosure is not limited the embodi-ments.

In this case, unless otherwise defined, the technical and scientific terms used in the specification of the present disclosure have the meanings that a person with ordinary skill in the art to which the present disclosure pertains typically understands, and the terms are defined in consid-eration of the functions of the present disclosure. These terms may vary depending on the intention of a user or an operator or a usual practice. Therefore, the definition of these terms should be made based on the entire contents of the present specification. In the following description, a detailed description of publicly-known functions and con-figurations will be omitted so as to avoid unnecessarily obscuring the subject matter of the present disclosure.

In addition, singular forms used in the specification and appended claims may be intended to include plural forms unless the context otherwise dictates.

Hereinafter, the present disclosure will be described in detail.

Figure 1:
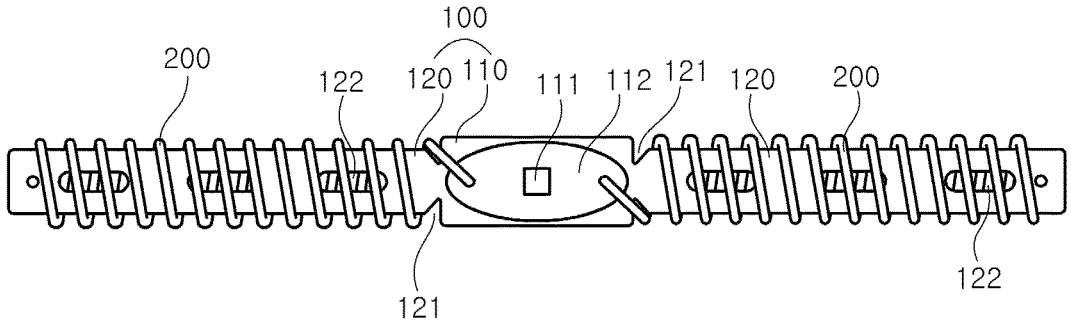
FIG. 1 is a configuration view of an attachable wireless identification tag for a tire according to an embodiment of the present disclosure.
Figure 2:
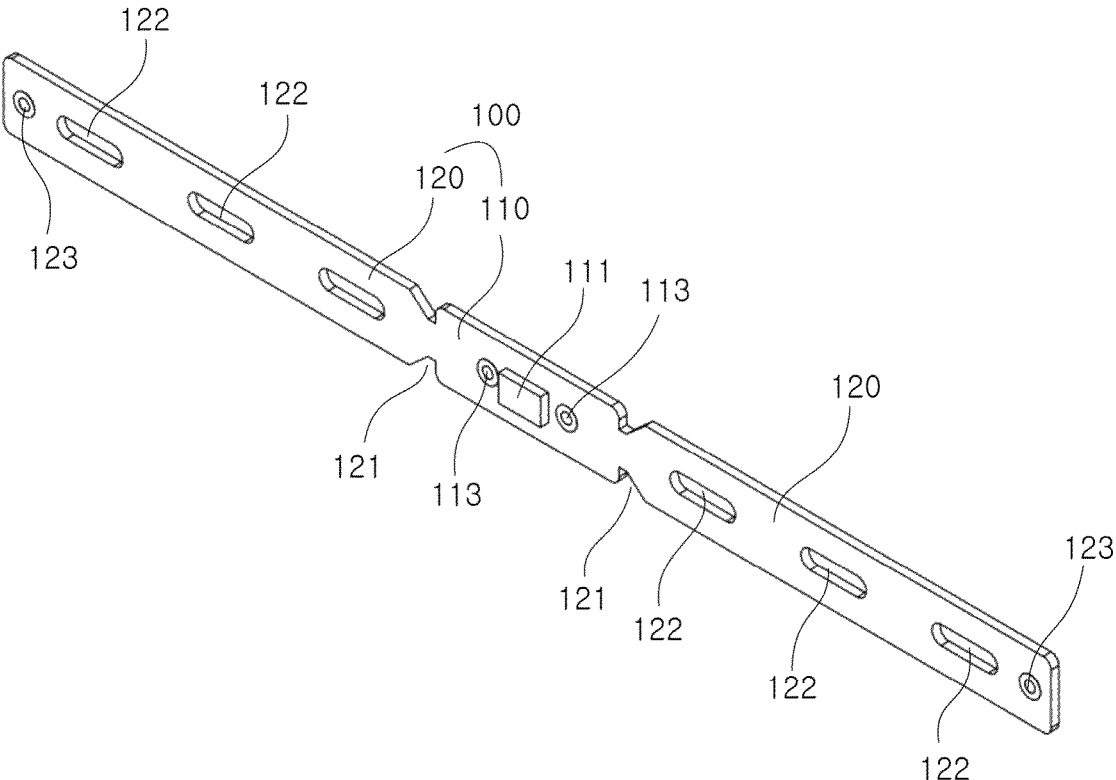
FIG. 2 is a configuration view of a PCB 100 according to the embodiment of the present disclosure.
Figure 3:
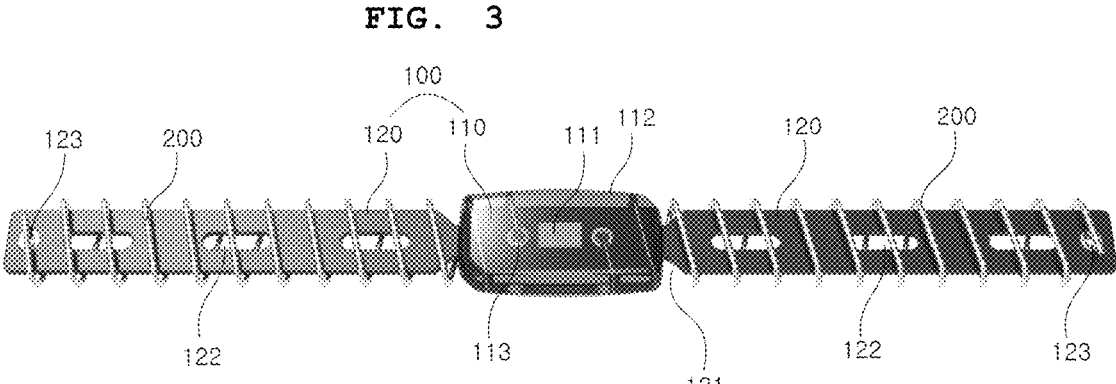
FIG. 3 is a view illustrating a state in which an antenna 200 is coupled to the PCB 100 in FIG. 2.
Figure 4:
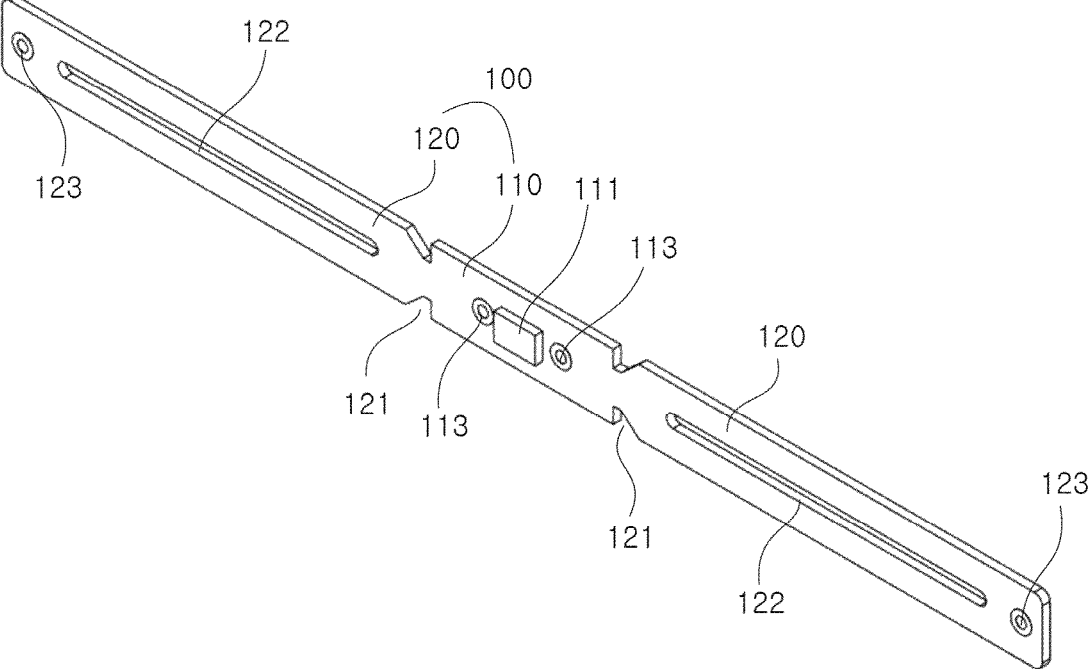
FIG. 4 is a configuration view of the PCB 100 according to another embodiment of the present disclosure.
Figure 5:
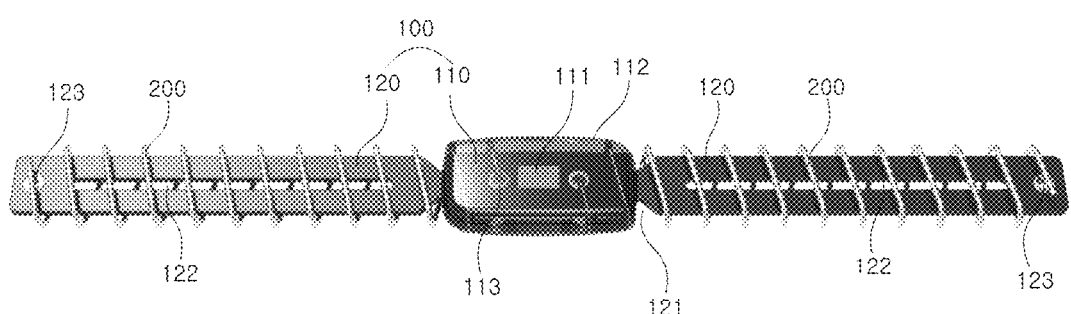
FIG. 5 is a view illustrating a state in which the antenna 200 is coupled to the PCB 100 in FIG. 4.
Figure 6:
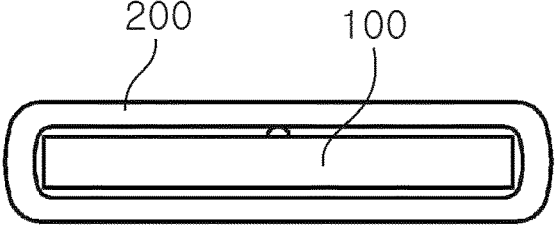
FIG. 6 is a side view of the attachable wireless identifi-cation tag for a tire according to the embodiment of the present disclosure.
Figure 7:
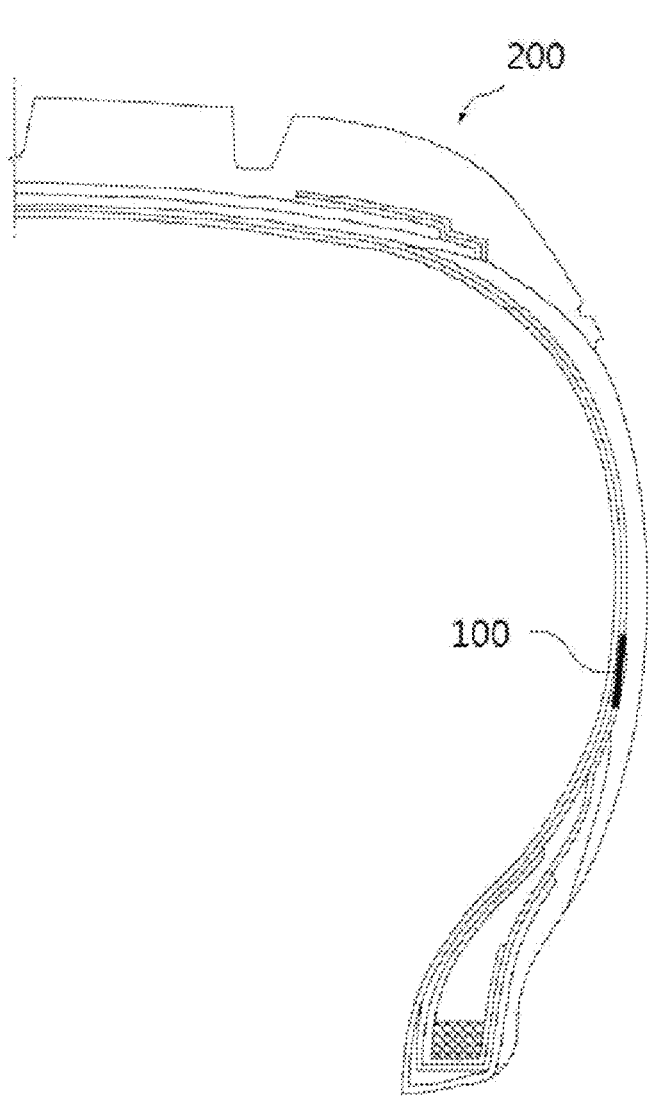
FIG. 7 is a partial cross-sectional view of a typical tire to which the wireless identification tag according to the embodiment of the present disclosure is attached.

FIG. 1 is a configuration view of an attachable wireless identification tag for a tire according to an embodiment of the present disclosure, FIG. 2 is a configuration view of a PCB 100 according to the embodiment of the present disclosure, FIG. 3 is a view illustrating a state in which an antenna 200 is coupled to the PCB 100 in FIG. 2, FIG. 4 is a configuration view of the PCB 100 according to another embodiment of the present disclosure, and FIG. 5 is a view illustrating a state in which the antenna 200 is coupled to the PCB 100 in FIG. 4.

With reference to FIGS. 1 to 3, an attachable wireless identification tag for a tire according to an embodiment of the present disclosure may include the PCB 100 including a main body part 110 and antenna installation parts 120 extending from two opposite sides of the main body part, an RFID chip 111 installed on the main body part 110, and the antennas 200 each having a predetermined length, formed in a helical shape, and fitted and coupled in a longitudinal direction of the antenna installation part 120. A forward/rearward width of an interior, which is defined by the helical shape of the antenna 200, may be larger than a forward/rearward width of the PCB 100, such that a space portion may be formed as the antenna installation part 120 and the antenna 200 are spaced apart from each other at a predeter-mined interval.

In the present disclosure, the PCB refers to a printed circuit board (PCB) configured such that a board, which is made by stacking copper plates, and a copper foil for wiring are finished into a single component by a technology such as pattern printing and etching. The printed circuit board, which is configured as described above, may be typically used for various types of electronic devices (household electrical appliances, computers, mobile communication devices, artificial satellites, or the like) in a state in which components, such as semiconductors, condensers, or resis-tors.

The PCB 100 may be made of paper phenol, glass fabric epoxy (FR-4), glass-based epoxy (CEM-1 or CEM-3), Tef-lon, metal, or ceramic. However, the present disclosure is not limited thereto. Particularly, the PCB may be made of a flame retardant-4 (FR-4) material.

In case that the PCB 100 is made of FR-4, the wireless identification tag may be manufactured to be light in weight and thin in thickness, and the wireless identification tag may have high heat resistance. A circuit of the PCB 100 may be printed by using gold and copper. The PCB 100 may have a thickness of 0.1 to 0.5 mm, a width of 1 to 5 mm, and a length of 25 to 75 mm. More particularly, the PCB 100 may have a thickness of 0.3 mm, a width of 3.5 mm, and a length of 40 mm.

In case that the PCB has a thickness of 0.2 mm, a width of 3 mm, and a length of 40 mm, the PCB may less degrade the original performance of the tire and may reduce an identification error even though the PCB is inserted into the tire.

In the present disclosure, the PCB 100 may include the main body part 110, and the antenna installation parts 120 extending from the two opposite sides of the main body part 110. Further, the antenna 200 has a predetermined length and is formed in a helical shape. The antenna 200 is fitted and coupled in the antenna longitudinal direction of the installation part 120. The forward/rearward width of the interior, which is defined by the helical shape of the antenna 200, may be larger than the forward/rearward width of the PCB 100, such that the space portion may be formed as the antenna installation part 120 and the antenna 200 are spaced apart from each other at a predetermined interval.

In this case, fitting holes may be respectively formed in the main body part 110 and the antenna installation part 120. One end of the antenna 200 may be coupled to the fitting hole of the main body part 110, and the other end of the antenna 200 may be coupled to the fitting hole of the antenna installation part 120. The main body part 110 and the antenna 200 may be coupled by lead welding, and the antenna installation part 120 and the antenna 200 may be coupled by lead welding.

For reference, the antenna 200 may be made of a metallic material, e.g., configured as a steel wire coated with brass. In addition, the antenna 200 may be formed in a helical shape or a spring shape. In this case, the number of turns may be 8 to 12.

In addition, the antenna 200 may be formed in various shapes such as a circular shape, a quadrangular shape, and a horizontal shape. In this case, the number of turns may also be appropriately selected from 6 to 20.

As described above, in the attachable wireless identification tag for a tire according to the embodiment of the present disclosure, the antenna 200 is spaced apart from the PCB 100 at a predetermined interval to define the space portion without being completely tightly attached to the PCB 100. The above-mentioned space portion may further improve a bonding force for attaching the wireless identification tag to the tire and further improve the durability after the wireless identification tag is bonded, such that the wireless identification tag may be used for a long period of time.

The wireless identification tag is attached to the tire. More specifically, the wireless identification tag is embedded at a predetermined depth in the tire.

In the present disclosure, a rubber, which constitutes the tire, is inserted into the space portion, and the wireless identification tag, together with the helical structure, is completely integrated with the rubber in the tire, such that the inserted tire rubber serves to hold both the PCB 100 and the antenna 200, thereby improving an attachment force of the wireless identification tag to the tire. In addition, the improved bonding force more improves the usage durability of the tire.

In addition, the attachable wireless identification tag for a tire according to the embodiment of the present disclosure may have fracturable guide grooves 121 formed in portions of the antenna installation parts 120 coupled to the main body part 110.

For example, as illustrated in the drawings, the fracturable guide groove 121 may be formed in an end portion of the antenna installation part 120 and inclined toward the main body part 110 while maintaining a quadrangular shape of the main body part 110.

The fracturable guide groove 121 of the PCB 100 is fractured first when an impact with a predetermined numerical value or more to the fracturable guide groove 121.

Because the tire is used in the state in which the wireless identification tag is attached to the interior of the tire, an impact with various intensities may be applied to the PCB 100 while the vehicle travels. The PCB 100 may fracture when the PCB 100 receives an impact with a predetermined numerical value or more. In this case, the fracturable guide groove 121 is formed so that the fracturable guide groove 121 fractures first prior to fractures of other portions.

As illustrated in the drawings, the fracturable guide groove 121 is formed in the portion of the antenna installation part 120 coupled to the main body part 110, and this portion is also positioned at a distance to some extent from the RFID chip 111, such that the RFID chip 111 is not fractured even though the fracturable guide groove 121 is fractured.

In addition, when the fracturable guide groove 121 is fractured, the antenna installation part 120 and the main body part 110 may change in shape in the state of being attached to the interior of the tire because the coupled state between the antenna installation part 120 and the main body part 110 is weakened even though the antenna installation part 120 and the main body part 110 are separated or not separated. However, the antenna 200 itself may maintain, in an intact manner, the unique operation of transmitting/receiving signals even though the antenna 200 is changed in shape or separated.

That is, in the present disclosure, even though a significant impact is applied to a degree to which the PCB 100 is damaged, the connectivity of the antenna 200 and the RFID chip 111 installed on the main body part 110 may be maintained. Therefore, even though the PCB 100 is damaged, the function may be maintained in an intact manner and used.

In addition, the above-mentioned structure of the fracturable guide groove 121 is inclined from the antenna installation part 120 toward the main body part 110. A part of the antenna 200 may be fitted with the fracturable guide groove 121. An inclination direction of the fracturable guide groove 121 is identical to a helical direction of the antenna 200, such that a part of the antenna 200 may be naturally fitted with the fracturable guide groove 121. The fracturable guide groove 121 may not only serve to fracture first in the event of an impact but also serve to naturally guide an operation of coupling the antenna 200 having a helical structure, thereby further facilitating the operation of coupling the antenna 200.

In addition, in the present disclosure, as necessary, the fracturable guide groove 121 may be configured to have a 'v' shape.

The attachable wireless identification tag for a tire according to the embodiment of the present disclosure may include a protective cap 112 provided on the main body part 110 to protect the RFID chip 111.

The protective cap 112 may be formed to be larger than the RFID chip 111 to protect the RFID chip 111. The protective cap 112 may be formed to be smaller than the main body part 110 and formed to cover the antenna 200, as necessary, thereby further improving the durability. Specifically, the protective cap 112 may be structured to cover a middle portion where the RFID chip 111 and the antenna 200 are connected by soldering. In addition, as illustrated in the drawings, the protective cap 112 may be formed in an elliptical shape or formed in a rectangular shape, as necessary.

In addition, the attachable wireless identification tag for a tire according to the embodiment of the present disclosure may have at least one rubber insertion hole 122 formed in the longitudinal direction of the antenna installation part 120. As illustrated in FIG. 2, three rubber insertion holes 122 may be formed in each of the antenna installation parts 120. As necessary, as illustrated in FIG. 4, one rubber insertion hole 122 may be formed in each of the antenna installation parts 120.

The rubber, which constitutes the tire, may be inserted into the rubber insertion holes 122, such that the wireless identification tag may be completely integrated with the rubber in the tire. In addition, the tire rubber, which is inserted as described above, serves to hold both the PCB 100 and the antenna 200, thereby further improving an attachment force of the wireless identification tag to the tire.

Figure 8:
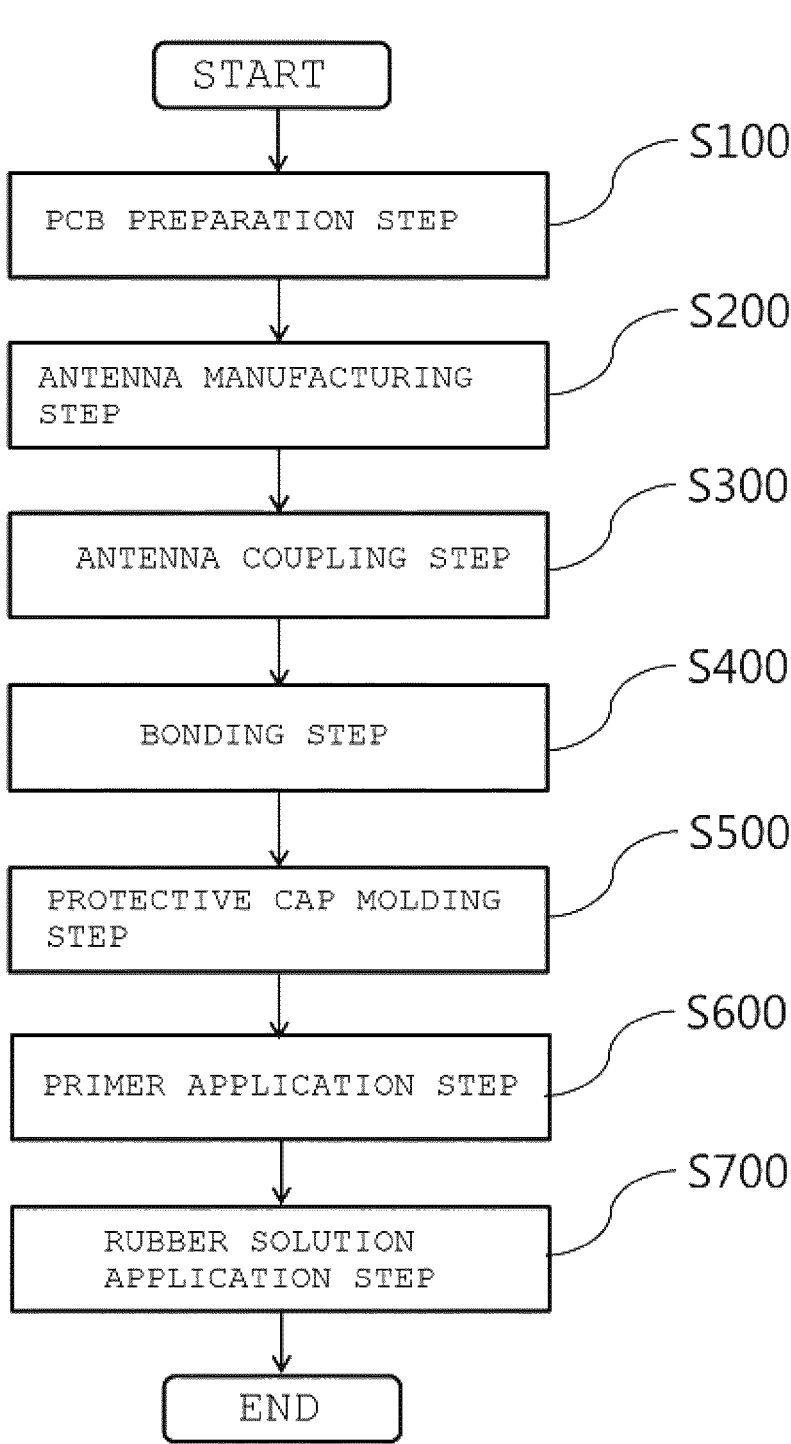
FIG. 8 is a flowchart for explaining a method of manu-facturing the attachable wireless identification tag for a tire according to the embodiment of the present disclosure.

FIG. 8 is a flowchart for explaining a method of manufacturing the attachable wireless identification tag for a tire according to the embodiment of the present disclosure.

With reference to FIG. 8, the method of manufacturing the attachable wireless identification tag for a tire according to the embodiment of the present disclosure may include step S100 of preparing the PCB 100 including the main body part 110 to which the RFID chip 111 is attached, and the antenna installation parts 120 extending from the two opposite sides of the main body part 110, step S200 of manufacturing the antennas 200 each having a predetermined length, formed in a helical shape, made of a metallic material, and configured such that the forward/rearward width of the interior defined by the helical shape is larger than the forward/rearward width of the PCB 100, step S300 of fitting, coupling, and inserting the antennas 200 into the ends of the antenna installation parts 120, and step S400 bonding the fitted and coupled antennas 200 and the RFID chip 111 to connect the antennas 200 and the RFID chip 111.

S100 step is a step of preparing the PCB 100 including the main body part 110 to which the RFID chip 111 is attached, and the antenna installation parts 120 extending from the two opposite sides of the main body part 110. For example, the forward/rearward width of the PCB 100 may be 0.1 to 0.5 mm, particularly 0.3 mm. In this case, the forward/rearward width of the PCB 100 is based on FIG. 1 or 2.

In addition, in step S100 of preparing the PCB, the RFID chip 111 may be attached to the PCB 100, and fitting holes 105 and 205, into which the ends of the antennas 200 may be inserted and coupled, may be formed.

For example, fitting holes 113 and 123 may be formed in the main body part 110 and the antenna installation parts 120.

S200 step is a step of manufacturing the antenna 200 having a predetermined length, formed in a helical shape, made of a metallic material, and configured such that the forward/rearward width of the interior defined by the helical shape is larger than the forward/rearward width of the PCB 100. For example, the antenna 200 may be made of stainless steel as a main material. For example, the forward/rearward width of the interior defined by the helical shape, i.e., a width of an internal space of the antenna 200 may be 0.15 to 1.0 mm, particularly 0.35 mm. In this case, the width of the internal space of the antenna 200 is based on FIG. 1 or 2.

In addition, a diameter of the antenna 200 may be 0.15 to 0.35 mm, particularly 0.22 to 0.25 mm.

S300 step is a step of inserting, fitting, and coupling the antenna 200 into the end of the antenna installation part 120, i.e., a step of fitting and coupling the antenna 200 manufactured to have a helical shape. With reference to FIG. 2, the antenna 200 may be fitted and coupled to the end of the antenna installation part 120 provided at each of the left and right sides.

For example, one end of the antenna 200 may be coupled to the fitting hole 113 of the main body part 110, and the other end of the antenna 200 may be coupled to the fitting hole 123 of the antenna installation part 120.

S400 step is a step of bonding the fitted and coupled antenna 200 and the RFID chip 111 to connect the antenna 200 and the RFID chip 111. A metal wire may be formed and bonded to electrically connect the fitted and coupled antenna 200 and the RFID chip 111. The metal wire may include a brass wire or a zinc-coated wire. The metal wire may be formed as a steel wire plated with brass to ensure the durability. At least one of metallic materials capable of operating the antenna 200 and the RFID chip 111 may be included.

In addition, in the method of manufacturing the attachable wireless identification tag for a tire according to the embodiment of the present disclosure, step 100 of preparing the PCB 200 may include performing a surface mount technology (SMT) and unchangeable ink coating.

The unchangeable ink used for the unchangeable ink coating may include UV ink, thermosetting ink (IR ink), photo imageable solder resist ink (PSR ink), or the like. However, the present disclosure is not limited thereto. Particularly, photo imageable solder resist black (PSR black) may be used. In case that the photo imageable solder resist black is used as the unchangeable ink, a mixture of thermosetting and photocurable components may be used, and a desired image may be formed by exposure and development.

Because a changeable ink is photosensitive, only a portion, which receives light, may be cured, and the remaining portion may be removed by a developer when the ink is exposed to ultraviolet rays. The unchangeable ink may protect circuits attached to the PCB and prevent the occurrence of a solder bridge between the circuits during an involved wave soldering process when the components are mounted on the PCB.

The unchangeable ink may include 10 to 45 parts by weight of epoxy acrylate oligomer, 0.5 to 5 parts by weight of 1,3,5-triglycidyl isocyanurate, 1 to 20 parts by weight of epoxy resin, acrylate resin, 3 to 15 parts by weight of photoinitiator, 10 to 30 parts by weight of pigment, 0.5 to 30 parts by weight of inorganic fillers, 10 to 40 parts by weight of solvent naphtha, and 5 to 25 parts by weight of solvent diethylene glycol monoethyl ether acetate.

The epoxy acrylate oligomer may be a diacrylate oligomer or a triacrylate oligomer with an adjusted viscosity. However, the present disclosure is not limited thereto. The unchangeable ink includes the epoxy acrylate oligomer, such that advantages, such as curing properties made by a photocuring agent, yellowing prevention, or the bonding force, may be improved.

The epoxy acrylate oligomer may be substituted with adipic acid at a ratio of 0.01 to 10 mol/L. However, the present disclosure is not limited thereto. Because the epoxy acrylate oligomer is substituted with adipic acid, hardening properties, curing properties, and insulating properties may be improved.

The 1,3,5-triglycidyl isocyanurate (TGIC) may have a curing function and improve electrical insulation while increasing a bonding force to ensure that a stable coating layer is formed.

The photoinitiator may be 2-methyl-4'-(methylthio)-2-morpholinopropiophenone, oligomeric alpha hydroxy ketone, 2-hydroxy-2-methyl-1-phenyl propane, or a mixture thereof. However, the present disclosure is not limited thereto. The unchangeable ink includes the photoinitiator to increase the curing rate, and the photoinitiator is coupled to the pigment to effectively show colors.

The pigment may be titanium dioxide ($TiO_2$) or zinc oxide (ZnO). However, the present disclosure is not limited thereto. Because the unchangeable ink includes the pigment, an ultraviolet absorption function may be provided, and the insulating properties of the unchangeable ink coating layer may be improved.

The inorganic filler may be barium sulfate, potassium permanganate ($KMNO_4$), or similar compounds. However, the present disclosure is not limited thereto. Because the unchangeable ink includes the inorganic, printing properties, heat resistance, and the like may be improved.

The solvent may include naphtha or diethylene glycol monoethyl ether acetate that corresponds to aromatic hydrocarbon having carbon of C9 to C16 and having a boiling point of 165° C. to 290° C. Because the unchangeable ink includes the solvent, the viscosity of the unchangeable ink may be adjusted by the solubility of the solvent.

In the step of coating the unchangeable ink, a coating thickness of the unchangeable ink may be 80 to 120 μm. However, the present disclosure is not limited thereto. In case that the coating thickness of the unchangeable ink is less than 80 μm, the heat resistance and sensitivity may be degraded, and it is difficult to exhibit the effect of protecting the circuit. In case that the coating thickness of the unchangeable ink more than 120 μm, etching may cause undercuts, which are grooves formed next to a conductor pattern, cause quick curing, and degrade wireless identification efficiency of the wireless identification tag.

In addition, the method according to the embodiment of the present disclosure may include step S500 of molding the protective cap 112 on the main body part 110 of the PCB 100 to which the antenna 200 is coupled.

The antenna 200 may be molded on the main body part 110 after the antenna 200 is coupled to the PCB 100 by steps S100 to S400, and the protective cap 112 may be formed by the molding.

In S500 step, the protective cap 112 may be formed by molding by means of epoxy resin coating or formed by EMC molding.

When the epoxy resin coating is performed, the length, width, and thickness of the epoxy resin coating may vary depending on the size of the main body part 110 on which the RFID chip is installed.

In order to reinforce a function of a material based on a thermosetting polymer material that forms a three-dimensional curing structure by external heat, an epoxy molding compound (EMC) material is an inorganic/organic composite material made by blending inorganic materials, thereby providing excellent forming properties and mechanical properties.

In addition, according to the embodiment of the present disclosure, the method may include step S600 of applying a primer onto the PCB 200, and step S700 of applying a rubber solution onto the PCB 200 onto which the primer is applied.

In the present disclosure, the wireless identification tag is manufactured by the method including step S600 of applying the primer, such that it is possible to improve a bonding force between the rubber solution and the unchangeable ink made of epoxy and applied onto a surface of the PCB 200.

A liquid polymeric compound having a solid content of 26 to 30% and having a viscosity of 800 to 1500 cps may be used for the primer. However, the present disclosure is not limited thereto.

Because the primer has the solid content and the viscosity, the primer applied onto the surface of the PCB 200 has excellent wettability, which may improve a joining force with the rubber solution and reduce a degree to which a film thickness is decreased by a sag of a liquid application material before the material is dried.

The primer is a liquid mixture and may be made of resin such as polyamide-based resin, polyester-based resin, polyurethane-based resin, epoxy-based resin, synthetic resin, and polyolefin-based resin. However, the present disclosure is not limited thereto. Particularly, the primer may be a polyolefin-based resin.

The polyolefin-based resin may be polyolefin-based resin having a functional group reactive to at least one unchangeable ink and the rubber solution. However, the present disclosure is not limited thereto.

In case that the polyolefin-based resin is used for the primer, the bonding force for the rubber solution and the unchangeable ink applied onto the PCB 200 may be excellent, and the bonding force may also be excellent even at a usage temperature of 100° C. or more.

The primer may include 45 to 50 parts by weight of xylene ($C_6H_4(CH_3)_2$), 25 to 35 parts by weight of ethyl benzene ($C_8H_{10}$), 1 to 5 parts by weight of zinc oxide (ZnO), 1 to 5 parts by weight of carbon black (C), 0.1 to 1.0 parts by weight of silica ($SiO_2$), 10 to 15 parts by weight of synthetic resin, and 5 to 10 parts by weight of modified polyethylene.

In addition, the primer may further include graphene with a particle size of about 20 to 50 nm. The graphene may have at least any one particle shape among a spherical shape, a plate shape, a needle shape, a rod shape, and a tubular shape. Preferably, the graphene having a spherical particle shape may be used. In case that the shape is anything other than spherical, the graphene particles may be formed in an angled shape and the bonding force may be reduced due to the angled portion. In case that the primer including the graphene there is less concern that the primer flows downward. Further, during a process in which the rubber solution is applied, the primer between the rubber solution and the unchangeable ink applied onto the PCB 200 may be securely maintained. A specific surface area of the graphene may be 1,000 to 2,000 $m^2/g$, more particularly 1,500 $m^2/g$.

The graphene may be modified by surface treatment and used, and the surface treatment may be performed by emitting microwaves.

In addition, the particle size of the primer may be 10 to 60 nm. However, the present disclosure is not limited thereto. Particularly, the particle size of the primer may be 30 to 40 nm.

In case that the particle size of the primer deviates from the above-mentioned condition, the specific surface area increases, and a contact interface increases as the particle size of the primer decreases. For this reason, the effect of decreasing the application thickness of the primer applied onto the surface of the RFID tag, uniformly applying the primer, and improving the bonding force with the surface of the unchangeable ink applied onto the surface of the PCB 200 may deteriorate.

In the step of applying the primer, the method of applying the primer and the application thickness are not limited. However, the primer with a thickness of 1 to 20 μm may be applied particularly by using a spray application method. The primer may be applied multiple times until the primer reaches the application thickness. Specifically, the primer with a thickness of 5 to 15 μm may be applied onto the PCB 200. In case that the primer with the above-mentioned thickness is applied by using the application method, the wettability may be excellent, and the bonding force between the unchangeable ink and the rubber solution may be improved, which may reduce a situation in which the film thickness is decreased by a sag of the liquid application material before the primer is dried.

In addition, after step S700 of applying the primer, the PCB 200 onto which the primer is applied may be dried by a dryer. For example, the PCB may be dried at a temperature of 50 to 100° C. for 1 to 20 minutes. However, the present disclosure is not limited thereto. Particularly, the PCB may be dried at a temperature of 60 to 90° C. for 1 to 10 minutes.

In case that the PCB 200, onto which the primer is applied, is dried under the drying condition, an optimal dried state of the primer may be implemented, and the bonding force between the rubber solution and the unchangeable ink applied onto the PCB 200 may be the best.

In step S700 of applying the rubber solution onto the PCB 200 having been subjected to the above-mentioned steps, a bonding force on the interface between a tire intermediate layer and a raw rubber, which remains after the mixed and manufactured rubber solution is applied and then the solvent is evaporated, may be improved when the rubber solution is applied. Therefore, there may be provided an effect of exhibiting a semipermanent bonding force with the tire when the PCB 200 onto which the rubber solution is applied is inserted directly into the tire and integrated with the tire. In addition, a risk of damage caused by external factors may be reduced, and insulating properties may be improved, such that an erroneous operation of the wireless identification tag may be prevented. The wireless identification tag may be protected from outside moisture, thereby providing an effect of preventing the wireless identification tag from being corroded.

In the present disclosure, the rubber solution may be prepared by mixing 40 to 100 parts by weight of an inorganic filler, 0.1 to 10 parts by weight of a vulcanizing agent, 2 to 10 parts by weight of a vulcanization accelerator, 6 to 12 parts by weight of a lubricant, 4 to 10 parts by weight of zincification, and 140 to 190 parts by weight of a solvent, relative to 100 parts by weight of a raw rubber.

The raw rubber may include natural rubber (NR), synthetic rubber (SR), or a mixture thereof and be used for a rubber composition for a typical tire. However, the present disclosure is not limited thereto.

In case that the raw rubber is made by mixing natural rubber and synthetic rubber and used, elasticity, wear resistance, and low-temperature properties are excellent. However, by mixing natural rubber and synthetic rubber, which has poor mechanical properties, it is possible to achieve high mechanical properties.

The raw rubber may be composed of natural rubber, synthetic rubber, or a mixture thereof in a concentration of 10 to 50 wt. %.

The natural rubber may be polyisoprene rubber obtained from nature.

One selected from a group consisting of styrene-butadiene rubber (SBR), modified-styrene butadiene rubber, butadiene rubber (BR), modified butadiene rubber, chlorosulphonated polyethylene rubber (CSM), epichlorohydrin rubber (ECO), fluorine rubber (FRM/FKM), silicone rubber (SI), vinyl-methyl silicone rubber (VMQ), fluorosilicone rubber (FMQ), acrylonitrile-butadiene rubber (NBR), hydrogenated nitrile rubber (HNBR), isobutene-isoprene rubber (IIR), nitrile butadiene rubber (NBR), modified nitrile butadiene rubber, chlorinated polyethylene rubber, styrene-ethylene-butylene-styrene rubber (SEBS), ethylene-propylene rubber (EPM), ethylene-propylene-diene rubber (EPDM), hypalon rubber, chloroprene rubber (CR), ethylene vinyl acetate rubber (EVM), ethylene-acrylic rubber (AEM), polyacrylate rubber (ACM), hydrin rubber, vinyl-benzyl-chloride-styrene-butadiene rubber, bromo-methyl-styrene-butyl rubber, maleic acid styrene butadiene rubber, carboxylic styrene butadiene rubber (XSBR), epoxy isoprene rubber, maleic acid ethylene propylene rubber, carboxylic nitrile butadiene rubber, and brominated polyisobutyl isoprene-co-paramethyl styrene (BIMS) may be used as the synthetic rubber. However, the present disclosure is not limited thereto.

A mixed rubber made by mixing natural rubber and synthetic rubber at a weight ratio of 50:50 may be used as the raw rubber.

By using the above raw rubber mixed in the above weight ratio, the durability of the wireless identification tag may be improved by appropriately taking the advantages of natural rubber having excellent wear resistance and synthetic rubber having excellent oil resistance, corrosion resistance, and friction resistance.

The inorganic filler may be selected from carbon black, alumina, aluminosilicate, calcium carbonate ($CaCO_3$), diatomaceous earth, bentonite, montmorillonite, nontronite, beidellite, volkonskoite, hectorite, saponite, sauconite, vermiculite, halloisite, sericite, or a mixture thereof. However, the present disclosure is not limited thereto. Particularly, the inorganic filler may be made of carbon black and calcium carbonate.

The carbon black may be any of several commonly used sources and different types of carbon black. For example, there may be N110, N121, N134, N220, N231, N234, N242, N293, N299, S315, N326, N330, N332, N339, N343, N347, N351, N358, N375, N539, N550, N582, N630, N642, N650, N683, N754, N762, N765, N774, N787, N907, N908, N990, N991, or the like.

Because the rubber solution includes the carbon black, the rubber product is reinforced by high surface area properties, and a particle diameter is fine, such that the carbon black is easily dispersed in the rubber solution, a molding speed is improved, and the durability, oil resistance, and heat resistance of the rubber product are increased.

The carbon black may be 30 to 70 parts by weight relative to 100 parts by weight of the raw rubber with respect to the rubber solution. However, the present disclosure is not limited thereto. Particularly, the carbon black may be 40 to 60 parts by weight relative to 100 parts by weight of the raw rubber with respect to the rubber solution.

The calcium carbonate may be any of several commonly used sources and different types of calcium carbonate. The calcium carbonate may be 10 to 30 parts by weight relative to 100 parts by weight of the raw rubber with respect to the rubber solution. However, the present disclosure is not limited thereto. Particularly, the calcium carbonate may be 15 to 25 parts by weight relative to raw rubber 100 parts by weight with respect to the rubber solution.

The vulcanizing agent may be selected from a group consisting of an inorganic vulcanizing agent, such as powdered sulfur(S), insoluble sulfur(S), precipitated sulfur(S), colloidal sulfur, or an organic vulcanizing agent, such as tetramethylthiuram disulfide (TMTD), tetraethyltriuram disulfide (TETD), and dithiodimorpholine, that are sulfur-based vulcanizing agents. However, the present disclosure is not limited thereto. Particularly, the vulcanizing agent may be powder sulfur.

Hereinafter, the present disclosure will be described in more detail with reference to examples and comparative examples.

However, the examples and the comparative examples are illustratively provided to explain the present disclosure in more detail. However, the present disclosure is not limited to the examples and the comparative examples to be described below.

Example 1

The PCB 100 made of an FR-4 material and having the forward/rearward width of 0.3 mm, the upward/downward width of 3.5 mm, and the leftward/rightward length of 40 mm was used. Further, the leftward/rightward length of the main body part 110 of the PCB 100 was set to 7 mm, and the PCB 100 was disposed at the center. The antenna installation parts 120 may be respectively provided at the two opposite sides of the main body part 110. Therefore, the antenna installation parts 120 each have the leftward/rightward length of 16.5 mm.

The antenna 200 having the helical structure was manufactured, and the antenna 200 in which the forward/rearward width of the interior of the antenna 200 was 0.35 mm was used. Further, specifically, the wireless identification tag, in which the space portion was formed by fitting and coupling the antennas 200 to the antenna installation parts 120 of the PCB 100, was used.

Example 2

A wireless identification tag, which was equal to that in Example 1 except that the wireless identification tag was formed in an elliptical shape by molding the protective cap 112 to cover the RFID chip installed on the main body part 110, was used.

Example 3

A wireless identification tag, which was equal to that in Example 1 except that the fracturable guide groove 121 was formed in the portion of the antenna installation part 120 that adjoined the main body part 110, was used.

Comparative Example 1

The PCB 100 made of an FR-4 material and having the forward/rearward width of 0.3 mm, the upward/downward width of 3.5 mm, and the leftward/rightward length of 40 mm was used. Further, the leftward/rightward length of the main body part 110 of the PCB 100 was set to 7 mm, and the PCB 100 was disposed at the center. The antenna installation parts 120 may be respectively provided at the two opposite sides of the main body part 110. Therefore, the antenna installation parts 120 each have the leftward/rightward length of 16.5 mm.

The antenna 200 having the helical structure was manufactured, and the antenna 200 in which the forward/rearward width of the interior of the antenna 200 was 0.3 mm was used. Further, the wireless identification tag, in which the space portion was not formed by fitting and coupling the antennas 200 to the antenna installation parts 120, was used.

<Experimental Example 1>—Bonding Force Test

In order to evaluate the effect of improving the bonding force of the RFID tags manufactured by Examples 1 to 3 and Comparative Example 1, tire specimens with a thickness of 0.2 cm, a length of 11 cm, and a width of 3 cm were manufactured by inserting and integrating the RFID tags manufactured by Examples 1 to 3 and Comparative Examples 1 directly into and with an intermediate layer of a tire, and joined strength was measured by an ASTM D429 (Method B) test method.

The joined strength was evaluated by leaving the tire specimens, to which the RFID tags manufactured by examples and comparative examples, unattended at room temperature for 30 minutes, and peeling off the tire specimens at a speed of 100 mm/min by using a universal tensile tester. Five joined specimens were measured, and calculated average values are shown in Table 1 below. In this case, the joining strength refers to a value made by dividing a width of the joined specimen by an average load.

TABLE 1

| Classification | Joining Strength (N/70 mm) |
|---|---|
| Example 1 | 10.8 |
| Example 2 | 11.2 |
| Example 3 | 11.9 |
| Comparative Example 1 | 8.8 |

It can be ascertained from Table 1 that the joining strength of the attachable wireless identification tag for a tire according to Example 1 is improved in comparison with Comparative Example 1.

Further, with reference to Examples 1 to 3, it can be ascertained that Example 2, in which the protective cap 112 is molded and the elliptical shape is formed, and Example 3, in which the fracturable guide groove 121 is formed, is improved in joining strength in comparison with Example 1.

<Experimental Example 2>—Durability Test

A durability test is a short-term test of conditions that may be assumed to be at the end of the tire lifespan to gauge the evaluation of the real test. The durability test was conducted under the following conditions: speed 200 to 240 km/h, load 440 to 830 kg, air pressure 44 to 51 psi, temperature 35 to 40° C., running time 60 to 80 minutes, and the speed was more than twice the normal speed of 200 km/h for 20 minutes, followed by 10 minutes at 210 km/h, 10 minutes at 220 km/h, 20 minutes at 230 km/h, and 10 minutes at 240 km/h.

Further, the traveling distance was performed in increments of 10,000 km, and the state was identified every 10,000 km.

TABLE 2

| Traveling Distance | Example 1 | Example 2 | Example 3 | Comparative Example 1 |
|---|---|---|---|---|
| 10,000 km | Good | Good | Good | Good |
| 20,000 km | Good | Good | Good | Good |

TABLE 2-continued

| Traveling Distance | Example 1 | Example 2 | Example 3 | Comparative Example 1 |
|---|---|---|---|---|
| 30,000 km | Good | Good | Good | Partially Defective |
| 40,000 km | Good | Good | Good | Defective |
| 50,000 km | Defective | Partially Defective | Good | Defective |
| 60,000 km | Defective | Defective | Good | Defective |

It can be ascertained from Table 2 that the durability of the attachable wireless identification tag for a tire according to Example 1 is improved in comparison with Comparative Example 1.

Further, with reference to Examples 1 to 3, it can be ascertained that Example 2, in which the protective cap 112 is molded and the elliptical shape is formed, and Example 3, in which the fracturable guide groove 121 is formed, is improved in durability in comparison with Example 1.

The detailed description of the exemplary embodiments of the present disclosure as described above has been provided to enable those skilled in the art to implement and carry out the present disclosure. While the present disclosure has been described above with reference to the exemplary embodiments, it may be understood by those skilled in the art that the present disclosure may be variously modified and changed without departing from the scope of the present disclosure. For example, those skilled in the art may use the components disclosed in the above-mentioned embodiments by combining the components.

Therefore, the present disclosure is not limited to the embodiments disclosed herein but intended to provide the widest scope consistent with the principles and novel features disclosed herein.

The present disclosure may be specified as other specific forms without departing from the spirit and the essential features of the present disclosure. Therefore, it should be appreciated that the detailed description is interpreted as being illustrative in every sense, not restrictive. The scope of the present disclosure should be determined based on the reasonable interpretation of the appended claims, and all of the modifications within the equivalent scope of the present disclosure belong to the scope of the present disclosure. The present disclosure is not limited to the embodiments disclosed herein but intended to provide the widest scope consistent with the principles and novel features disclosed herein. In addition, the embodiments may be configured, or new claims may be added by amendments after filing the application by combining claims that do not have explicit relationships therebetween.

What is claimed is:

1. An embedded wireless identification tag for a tire, the embedded wireless identification tag comprising:
  a PCB comprising a main body part, and antenna installation parts extending from two opposite sides of the main body part;
  an RFID chip installed on the main body part; and
  an antenna having a predetermined length, formed in a helical shape, and fitted and coupled in a longitudinal direction of the antenna installation part such that the antenna is helically wound around the antenna installation part along the longitudinal direction of the antenna installation part,
  wherein a forward/rearward width of an interior defined by the helical shape of the antenna is larger than a forward/rearward width of the PCB, such that the antenna installation part and the antenna are spaced apart from each other at a predetermined interval to form a space portion, and
  wherein fitting holes are formed in the main body part and the antenna installation part, one end of the antenna is coupled to the fitting hole of the main body part, and the other end of the antenna is coupled to the fitting hole of the antenna installation part,
  wherein each of the antenna installation parts has a rubber insertion hole formed as a slot-shaped through hole extending in the longitudinal direction of the antenna installation part,
  wherein fracturable guide grooves are formed in portions of the antenna installation parts coupled to the main body part, each fracturable guide groove being inclined from the antenna installation part toward the main body part and configured to have a V-shape, and a portion of the antenna is fitted with the fracturable guide groove such that an inclination direction of the fracturable guide groove is identical to a helical direction of the antenna.

2. The embedded wireless identification tag of claim 1, wherein one end of the antenna is coupled to the fitting hole of the main body part by soldering, and the other end of the antenna is coupled to the fitting hole of the antenna installation part by soldering.

3. The embedded wireless identification tag of claim 1, wherein each fracturable guide groove is formed in an end portion of the antenna installation part adjacent to the main body part and is inclined toward the main body part while maintaining a quadrangular shape of the main body part.

4. The embedded wireless identification tag of claim 1, further comprising:
  a protective cap molded on the main body part to protect the RFID chip.

5. The embedded wireless identification tag of claim 4, wherein the protective cap covers a middle portion where the RFID chip and the antenna are connected by soldering.

6. A method of manufacturing an embedded wireless identification tag for a tire, the method comprising:
  preparing a PCB comprising a main body part, to which an RFID chip is attached, and antenna installation parts extending from two opposite sides of the main body part;
  forming fitting holes in the main body part and the antenna installation parts;
  forming, in each of the antenna installation parts, a rubber insertion hole as a slot-shaped through hole extending in a longitudinal direction of the antenna installation part;
  forming fracturable guide grooves in portions of the antenna installation parts coupled to the main body part, each fracturable guide groove being inclined from the antenna installation part toward the main body part and having a V-shape;
  manufacturing an antenna having a predetermined length, formed in a helical shape, made of a metallic material, and configured such that a forward/rearward width of an interior defined by the helical shape is larger than a forward/rearward width of the PCB and that the antenna is helically wound around the antenna installation part along the longitudinal direction of the antenna installation part;
  inserting, fitting, and coupling the antenna into an end of the antenna installation part such that a portion of the antenna is received in the fracturable guide groove and an inclination direction of the fracturable guide groove is identical to a helical direction of the antenna;

coupling one end of the antenna to the fitting hole of the main body part and coupling the other end of the antenna to the fitting hole of the antenna installation part; and bonding the fitted and coupled antenna and the RFID chip to connect the antenna and the RFID chip.

7. The method of claim 6, comprising:

molding a protective cap on the main body part of the PCB to which the antenna is coupled;

applying a primer onto the PCB; and applying a rubber solution onto the PCB.

\* \* \* \* \*